United States Patent [19]

Shimada et al.

[11] Patent Number: 5,068,149

[45] Date of Patent: Nov. 26, 1991

[54] WIRE MEMBER OF CEMENTED CARBIDE

[75] Inventors: Fumio Shimada, Yokohama; Tadashi Kainuma, Tokorozawa, both of Japan

[73] Assignee: Mitsubishi Materials Corporation, Tokyo, Japan

[21] Appl. No.: 249,909

[22] Filed: Sep. 27, 1988

Related U.S. Application Data

[63] Continuation-in-part of Ser. No. 30,173, Mar. 25, 1987.

[30] Foreign Application Priority Data

Mar. 28, 1986 [JP] Japan .................................. 61-68432
Mar. 28, 1986 [JP] Japan .................................. 61-68433

[51] Int. Cl.$^5$ ............................ B32B 9/00; B21C 1/00

[52] U.S. Cl. .................................... 428/367; 428/364; 428/372; 428/379; 428/401; 72/467

[58] Field of Search ............... 428/364, 367, 379, 372, 428/401; 72/467

[56] References Cited

U.S. PATENT DOCUMENTS 4,652,157 3/1987 Uzawa et al. ....................... 400/124

FOREIGN PATENT DOCUMENTS 0148613 7/1985 European Pat. Off. .

OTHER PUBLICATIONS

*Patent Abstracts of Japan*, vol. 10; No. 161 (C-352) (2217); Jun. 10, 1986.
*Patent Abstracts of Japan*, vol. 11, No. 63 (C-406) (2510); Feb. 26, 1987.

*Primary Examiner*—Lorraine T. Kendell
*Attorney, Agent, or Firm*—Scully, Scott, Murphy & Presser

[57] ABSTRACT

A cemented carbide contains a binder phase of 4 to 35% by weight of at least one of cobalt and nickel, 1 to 50 ppm by weight of impurities and a hard dispersed phase of balance tungsten carbide. The tungsten carbide has an average crystal grain size ranging from 0.2 to 1.5 μm. The grain size of the impurities is not larger than 10 μm. The binder phase has an average crystal grain size of 5 to 400 μm. The cemented carbide may contain a binder phase of 4 to 35% by weight of at least one of cobalt and nickel, 1 to 50 ppm by weight of impurities, and a hard dispersed phase of 0.1 to 40% by weight of at least one compound and balance tungsten carbide. The compound may be carbides of metals in Groups $IV_A$, $V_A$ and $VI_A$ of the Periodic Table other than tungsten, nitrides of metals in Groups $IV_A$ and $V_A$ of the Periodic Table or solid solution of at least two of the carbides and nitrides.

3 Claims, No Drawings

WIRE MEMBER OF CEMENTED CARBIDE

CROSS-REFERENCE TO RELATED APPLICATION

This is a continuation-in-part of our application Ser. No. 030,173 filed Mar. 25, 1987.

BACKGROUND OF THE INVENTION

1. Field of the Invention

The present invention pertains to a cemented carbide which is excellent in toughness and wear resistance and is suitably used for solid end mills, solid drill bits and wire members.

2. Prior Art

Heretofore, print pins of a dot printer, solid end mills or solid drill bits have been often made of WC-based cemented carbide since high wear resistance is required. Such conventional cemented carbide includes a hard dispersed phase composed of tungsten carbide and a binder phase composed of 4 to 20% by weight of one or two metals of cobalt and nickel. In some cases, the hard dispersed phase further contains 0.1 to 40% by weight of one or more of compounds selected from the group consisting of carbides of metals in Groups $IV_A$, $V_A$ and $VI_A$ of the Periodic Table other than tungsten, nitrides of metals in Groups $IV_A$ and $V_A$ of the Periodic Table and solid solution of two or more of these carbides and nitrides.

Although the prior art cemented carbide as mentioned above has been superior in wear resistance, it has been inferior in toughness, thereby being susceptible to breakage in actual use. This has been especially the case with apparatuses developed in recent years wherein requirements for such cemented carbide are getting severe in order to achieve a higher speed operation as well as a higher performance.

SUMMARY OF THE INVENTION

It is therefore an object of the present invention to provide a cemented carbide which exhibits not only high wear resistance but excellent toughness as well.

According to a first aspect of the present invention, there is provided a cemented carbide consisting of a binder phase of 4 to 35% by weight of at least one metal selected from the group consisting of cobalt and nickel; 1 to 50 ppm by weight of impurities; and a hard dispersed phase of balance tungsten carbide; the tungsten carbide having an average crystal grain size of 0.2 to 1.5 μm, the impurities having a crystal grain size of no larger than 10 μm, the binder phase having an average crystal grain size of 5 to 400 μm.

According to a second aspect of the present invention, there is provided a cemented carbide consisting of a binder phase of 4 to 35% by weight of at least one metal selected from the group consisting of cobalt and nickel; 1 to 50 ppm by weight of impurities; and a hard dispersed phase composed of 0.1 to 40% by weight of at least one compound and balance tungsten carbide; the at least one compound being selected from group consisting of carbides of metals in Groups $IV_A$, $V_A$ and $VI_A$ of the Periodic Table, nitrides of metals in Groups $IV_A$ and $V_A$ of the Periodic Table and solid solution of at least two of the carbides and nitrides, the hard dispersed phase having an average crystal grain size of 0.2 to 1.5 μm, the impurities having a crystal grain size of no larger than 10 μm, the binder phase having an average crystal grain size of 5 to 400 μm.

DESCRIPTION OF THE INVENTION

It has been found that the hard dispersed phase of the prior art cemented carbide as described above has an average crystal grain size ranging from 1.5 to 5 μm, and that impurities are present in the content of 100 ppm by weight. In addition, the majority of the impurities have an average crystal grain size fallen within a range of 15 to 45 μm. The inventors have made an extensive study over the improvement of such a prior art cemented carbide, and have obtained a cemented carbide in accordance with the present invention which includes a binder phase of 4 to 35% by weight of at least one metal selected from the group consisting of cobalt and nickel, 1 to 50 ppm by weight of impurities, and a hard dispersed phase of balance tungsten carbide, the tungsten carbide having an average crystal grain size of 0.2 to 1.5 μm, the impurities having a crystal grain size of no larger than 10 μm, the binder phase having an average crystal grain size of 5 to 400 μm.

In the cemented carbide in accordance with the present invention, the average crystal grain sizes in the hard dispersed and binder phases as well as the content of the impurities are reduced substantially, and the impurities of a large grain size exceeding 10 μm are avoided. With this construction, the cemented carbide exhibits high toughness, and when it is used to manufacture solid end mills or drill bits, the resulting tools become less susceptible to fracture, thereby exhibiting a very high reliability. Further, if the above cemented carbide is modified so that the average crystal grain size of the tungsten carbide ranges from 0.2 to 1.0 μm and is used to manufacture wire members, the resulting wire members exhibit sufficiently high toughness to such an extent that they can be bent at a radius of curvature satisfying the following relationship:

$$(15 \text{ to } 50) \times (\text{diameter of wire member})$$

In the foregoing, if the content of the binder phase is less than 4% by weight, the cemented carbide fails to have sufficient toughness. On the other hand, if the content of the binder phase exceeds 35% by weight, the cemented carbide becomes less resistant to wear. In order to obtain cemented carbide having higher toughness, the impurities had better be avoided, and besides it is favorable to make crystal grain sizes of the hard dispersed and binder phases as small as possible. Due to the difficulties in the manufacture, however, cemented carbide with tungsten carbide of an average crystal grain size smaller than 0.2 μm and with the binder phase of an average crystal grain size smaller than 5 μm cannot be obtained, and the content of impurities cannot be reduced to less than 1 ppm by weight. On the other hand, if the average crystal grain size of the hard dispersed and binder phases and the content of the impurities exceed 1.5 μm, 400 μm and 50 ppm by weight, respectively, the cemented carbide fails to exhibit a sufficiently high toughness. In particular, in order to obtain wire members with a sufficiently high toughness, the average crystal grain size of the binder phase should preferably be no greater than 10 μm.

Generally, the impurities segregated at the grain boundaries of the binder phase lower the toughness of the cemented carbide. However, in the present invention, since the average crystal grain size of the binder phase is limited to be less than 400 μm, the impurities segregated at the grain boundaries are reduced in grain sizes to no greater than 10 μm. As a result, the toughness of the cemented carbide is prevented from being lowered.

Moreover, the impurities almost always include phosphorus (P), but it is preferable to reduce its content to no greater than 20 ppm by weight since it facilitates the grain growth of the tungsten carbide.

Further, in order to increase wear resistance, at least one compound selected from the group consisting of carbides of metals in Groups $IV_A$, $V_A$ and $VI_A$ of the Periodic Table except tungsten, nitrides of metals in Groups $IV_A$ and $V_A$ of the Periodic Table and solid solution of two or more of the above carbides and nitrides may be contained in the hard dispersed phase. In such a case, the amount of the compound to be added should range from 0.1 to 40% by weight. If the amount is less than 0.1% by weight, no increase in wear resistance can be expected practically. On the other hand, the hard dispersed phase in excess of 40% by weight adversely affects the toughness of the cemented carbide.

The cemented carbide as described above is produced by a conventional process. The inventors, however, have unexpectedly found that if a sintered compact is subjected to hot plastic working such as hot drawing, hot rolling with grooved rolls, hot forging and the like prior to grinding, the cemented carbide product thus obtained exhibits higher toughness than the product produced without hot-working. In such a case, however, the content of the binder phase should be preferably within a range of 15 to 35% by weight, and the hot-worked microstructure of the binder phase has to have an average crystal grain size of 5 to 400 μm. When the cemented carbide thus modified is used to manufacture a wire member of a diameter of 0.05 to 2 mm, the resulting wire member can be bent at a reduced radius of curvature of the following relationship:

$$(10 \text{ to } 40) \times (\text{diameter of wire member})$$

Although the wire member usually has a circular cross-section, it may have a regular polygonal cross-section. In such a case, the distance between an axis of the wire member and a point on a periphery of the wire member disposed farthest from the axis of the wire member, i.e., an equivalent radius of the wire member should be within the range of 0.025 to 1 mm.

The invention will now be described in more detail with reference to the following examples.

EXAMPLE 1

There were prepared powders for forming a hard dispersed phase having a purity of 99.98% by weight and an average particle size of 0.2 to 1.5 μm, and powders of a binder phase having a purity of 99.99% by weight and an average particle size of 1.5 μm. These powders were matched in blend compositions set forth in Tables 1-1 and 1-2, and a small quantity of paraffin was added as a lubricant to the matched powders. Thereafter, the powders were mixed in an ethanol solvent by an attrition mill for 6 hours, and then were extruded at a pressure of 5 to 20 $Kg/mm^2$ to form green compacts. Subsequently, the compacts were subjected to presintering at a temperature of 400° to 600° C. for a period of 1 hour to completely remove the above lubricant. The steps from the mixing to the presintering were carried out in a clean room to prevent impurities from getting mixed in the materials. Subsequently, the presintered bodies were sintered in a vacuum at a temperature of 1,350° to 1,500° C. for a period of 30 minutes to produce cemented carbides 1 to 20 in accordance with the present invention, each cemented carbide having a size of 6.5 $mm^{\phi} \times 50.5\ mm^{l}$.

For comparison purposes, comparative cemented carbides 1 to 20 were prepared according to the above procedure except that powders having a purity of 99.5 to 99.9% by weight and an average particle size of 1.5 to 5 μm were prepared as powder materials for forming the binder and hard dispersed phases, and that the steps from the mixing to the presintering were carried out in normal surroundings, i.e., in an ordinary room.

Then, the cemented carbides 1 to 20 of the invention and the comparative cemented carbides 1 to 20 were tested as to the average grain size of the tungsten carbide, the average grain size of the other compounds in the hard dispersed phase, the content of the impurities, the content of phosphorus in the impurities, and the maximum grain size of the impurities. In addition, in order to evaluate the wear resistance of each cemented carbide, Vickers hardness was measured. The results are set forth in Tables 1-1, 1-2, 2-1 and 2-2.

Subsequently, the cemented carbides of the invention and the comparative cemented carbides were ground to provide four-flute solid end mills 1 to 20 in accordance with the present invention each having a size of 6.0 $mm^{\phi} \times 50.0\ mm^{l}$. Then, in order to evaluate the toughness, a cutting test was conducted under the following conditions:

Workpiece: alloy tool steel (ASTM H13; JIS SKD61; Hardness HRC40)
Cutting speed: 30 m/minute
Feed rate: 0.1 mm/revolution
Depth of cut: 6 mm In the cutting test, a groove was formed until the cutting edges of each end mill were subjected to chipping, and the length of the groove thus formed was measured.

The results of the above cutting test are shown in Tables 3-1, 3-2, 4-1 and 4-2. As will be clearly seen from Tables 1-1 to 2-2, the cemented carbides 1 to 20 in accordance with the present invention exhibited as high hardness as the comparative cemented carbide 1 to 20 did. In addition, as seen from Tables 3-1 to 4-2, each of the end mills in accordance with the present invention exhibited excellent toughness to such an extent that it could cut about 15 to 30 m. In contrast, the lengths cut by the comparative end mills 1 to 20 were only 0.1 to 3 m.

EXAMPLE 2

The same powder materials as those in Example 1 were mixed in the same blend compositions, and the same method as that in Example 1 was repeated to provide sintered compacts of 11.5 mm $\times$ 95 $mm^{l}$. Then, the sintered compacts were ground to provide solid drill bits 1 to 20 in accordance with the present invention, each drill bit having a size of 10.5 $mm^{\phi} \times 90\ mm^{l}$. Similarly, the method in Example 1 was repeated to provide comparative solid drill bits 1 to 20.

Subsequently, in order to evaluate the toughness of the drill bits thus obtained, a drilling test was conducted under the following conditions:

Workpiece: carbon steel (AISI 1045; JIS S45C; Hardness HB160)

Peripheral speed: 50 m/minute
Feed rate: 0.3 mm/revolution
Depth of bore: 50 mm

In the drilling test, bores were formed until the drill bit was subjected to fracture, and the number of the bores thus formed was counted. The results of this test are also shown in Tables 3-1 to 4-2.

As clearly seen from Tables 3-1 to 4-2, the drill bits 1 to 20 in accordance with the present invention exhibited excellent toughness to such an extent that it could form around two thousands bores or more. In contrast, all the comparative drill bits 1 to 20 could form only a small number of bores.

EXAMPLE 3

The same powder materials as those in Example 1 were mixed in the same blend compositions, and the same method as that in Example 1 was repeated to provide cemented carbides 1 to 10 of the invention. Then, the cemented carbides were ground to provide wire members 1 to 10 in accordance with the present invention, each wire member having a diameter as set forth in Table 3-1. Similarly, the method in Example 1 was repeated to provide comparative wire members 1 to 10 having diameters as set forth in Table 4-1. Subsequently, in order to evaluate the toughness, a critical radius of curvature at which each wire member was broken when subjected to bending by 360° was measured. The results obtained are also shown in Tables 3-1 and 4-1.

As will be seen from Tables 3-1 and 4-1, all the comparative wire members 1 to 10 were broken when they were bent into an arcuate shape. In contrast, the wire members 1 to 10 in accordance with the present invention exhibited excellent toughness to such an extent that they could be bent at a considerably small radius of curvature.

EXAMPLE 4

The procedure of Example 1 was repeated to produce sintered compacts having blend compositions as set forth in Table 5. Then, the sintered compacts were subjected to hot drawing under conditions as set forth in Table 5 to provide cemented carbides 21 to 25 in accordance with the present invention. The cemented carbides thus produced was tested as to the same properties as those in Example 1. Besides, solid end mills, solid drill bits and wire members in accordance with the present invention were manufactured by using those cemented carbides, and the toughness of each product was evaluated in the same manner as in Examples 1 to 3. The results are set forth in Tables 5 and 7.

For comparison purposes, powders, matched in the same blend compositions as those in the cemented carbides 21 to 25 of the invention, were treated according to the same procedures as in Examples 1 to 3 to produce comparative cemented carbides 21 to 25 as well as comparative cemented carbide products 21 to 25, and the same evaluation tests as in Examples 1 to 3 were carried out. The results are shown in Tables 6 and 8.

From Tables 5 to 8, it is seen that the cemented carbides and their products of the invention have highly improved toughness as compared with the comparative ones.

As described above, the cemented carbide in accordance with the present invention has not only high wear resistance but also excellent toughness. Consequently, such cemented carbide can be suitably used to produce solid end mills, solid drill bits or wire members which require high toughness as well as high wear resistance.

TABLE 1-1

| | | Cemented carbides of the invention | | | | | | | | | |
|---|---|---|---|---|---|---|---|---|---|---|---|
| | | 1 | 2 | 3 | 4 | 5 | 6 | 7 | 8 | 9 | 10 |
| Blend compositions (wt. %) | | | | | | | | | | | |
| Binder phase | Co | 4 | 10 | 20 | 25 | 30 | 35 | 16 | 15 | 10 | 16 |
| | Ni | — | — | 1.5 | — | 5 | — | — | — | — | — |
| Hard phase | WC and impurities | 96 | 90 | 78.5 | 75 | 65 | 65 | 81.5 | 80.5 | 85 | 49 |
| | Other compounds | — | — | — | — | — | — | 1 (TiC) 1.5 (TaC) | 1.5 (VC) 1 ($Cr_3C_2$) 2 (TiCN) | 2 (TiC) 3 (TiN) | 20 (TiC) 15 (TaC) |
| Average grain size of WC (μm) | | 0.32 | 0.45 | 0.45 | 0.65 | 0.72 | 0.25 | 0.58 | 0.52 | 0.42 | 0.85 |
| Average grain size of other compounds in hard phase (μm) | | — | — | — | — | — | — | 0.53 | 0.79 | 0.83 | 0.92 |
| Average grain size of binder phase (μm) | | 33 | 24 | 20 | 103 | 88 | 101 | 273 | 141 | 254 | 301 |
| Content of impurities (ppm) | | 32 | 36 | 34 | 35 | 42 | 22 | 40 | 38 | 38 | 48 |
| Content of P in impurities (ppm) | | 15 | 18 | 12 | 16 | 8 | 13 | 16 | 9 | 3 | 5 |
| Maximum size of impurities (μm) | | 0.4 | 1.1 | 1.9 | 1.8 | 2.3 | 1.6 | 2.8 | 2.5 | 3.1 | 3.7 |
| Vickers hardness (Hv) | | 1685 | 1601 | 1210 | 988 | 783 | 776 | 1413 | 1497 | 1672 | 1532 |

TABLE 1-2

| | | Cemented carbides of the invention | | | | | | | | | |
|---|---|---|---|---|---|---|---|---|---|---|---|
| | | 11 | 12 | 13 | 14 | 15 | 16 | 17 | 18 | 19 | 20 |
| Blend compositions (wt. %) | | | | | | | | | | | |
| Binder phase | Co | 20 | 10 | 10 | 10 | 12 | 12 | 12 | 12 | 25 | 30 |
| | Ni | 10 | — | — | — | — | — | — | — | — | — |
| Hard phase | WC and impurities | 80 | 90 | 88 | 89.2 | 87 | 86 | 86.5 | 87.5 | 73 | 66 |
| | Other compounds | | | 2.0 (TaC) | 0.8 ($Cr_3C_2$) | 1.0 ($Cr_3C_2$) | 1.0 ($Cr_3C_2$) 1.0 (TaC) | 1.0 ($Cr_3C_2$) 0.5 (VC) | 0.5 (VC) | 1.5 ($Cr_3C_2$) 0.5 (VC) | 1.5 ($Cr_3C_2$) 0.5 (VC) |

TABLE 1-2-continued

| | Cemented carbides of the invention | | | | | | | | | |
|---|---|---|---|---|---|---|---|---|---|---|
| | 11 | 12 | 13 | 14 | 15 | 16 | 17 | 18 | 19 | 20 |
| | | | | | | | | | | 2.0<br>(TaC) |
| Average grain size of WC (μm) | 1.31 | 1.42 | 1.38 | 0.9 | 1.14 | 0.73 | 1.46 | 1.36 | 0.42 | 1.23 |
| Average grain size of other compounds in hard phase (μm) | — | — | 0.91 | dissolved with binder | | 0.78 | dissolved with binder | | | 1.04 |
| Average grain size of binder phase (μm) | 84 | 76 | 48 | 139 | 209 | 78 | 54 | 192 | 68 | 112 |
| Content of impurities (ppm) | 46 | 4 | 83 | 43 | 23 | 49 | 6 | 23 | 13 | 74 |
| Content of P in impurities (ppm) | 18 | 14 | 19 | 7 | 10 | 11 | 6 | 8 | 193 | 14 |
| Maximum size of impurities (μm) | 0.5 | 0.3 | 0.9 | 0.4 | 2.8 | 0.4 | 0.3 | 2.3 | 0.3 | 1.12 |
| Vickers hardness (Hv) | 903 | 1524 | 1608 | 1654 | 1593 | 1634 | 1734 | 1689 | 1326 | 1214 |

TABLE 2-1

| | | Comparative cemented carbides | | | | | | | | | |
|---|---|---|---|---|---|---|---|---|---|---|---|
| | | 1 | 2 | 3 | 4 | 5 | 6 | 7 | 8 | 9 | 10 |
| Blend compositions (wt. %) | | | | | | | | | | | |
| Binder phase | Co | 4 | 10 | 20 | 25 | 30 | 35 | 16 | 15 | 10 | 16 |
| | Ni | — | — | 1.5 | — | 5 | — | — | — | — | — |
| Hard phase | WC and impurities | 96 | 90 | 78.5 | 75 | 65 | 65 | 81.5 | 80.5 | 85 | 49 |
| | Other compounds | — | — | — | — | — | — | 1<br>(TiC)<br>1.5<br>(TaC) | 1.5<br>(VC)<br>1<br>($Cr_3C_2$)<br>2<br>(TiCN) | 2<br>(TiC)<br>3<br>(TiN) | 20<br>(TiC)<br>15<br>(TaC) |
| Average grain size of WC (μm) | | 1.82 | 1.77 | 3.26 | 3.35 | 4.51 | 2.69 | 4.51 | 2.48 | 2.56 | 2.44 |
| Average grain size of other compounds in hard phase (μm) | | — | — | — | — | — | — | 1.57 | 1.84 | 2.02 | 3.93 |
| Average grain size of binder phase (μm) | | 735 | 893 | 752 | 493 | 1304 | 638 | 889 | 854 | 783 | 1037 |
| Content of impurities (ppm) | | 121 | 136 | 139 | 143 | 202 | 114 | 210 | 243 | 198 | 403 |
| Content of P in impurities (ppm) | | 43 | 53 | 43 | 103 | 68 | 72 | 119 | 88 | 39 | 21 |
| Maximum size of impurities (μm) | | 18.8 | 17.2 | 21.5 | 22.4 | 27.7 | 31.4 | 19.6 | 23.1 | 16.8 | 38.3 |
| Vickers hardness (Hv) | | 1639 | 1504 | 1127 | 913 | 696 | 701 | 1189 | 1222 | 1498 | 1257 |

TABLE 2-2

| | | Comparative cemented carbides | | | | | | | | | |
|---|---|---|---|---|---|---|---|---|---|---|---|
| | | 11 | 12 | 13 | 14 | 15 | 16 | 17 | 18 | 19 | 20 |
| Blend compositions (wt. %) | | | | | | | | | | | |
| Binder phase | Co | 20 | 10 | 10 | 10 | 12 | 12 | 12 | 12 | 25 | 30 |
| | Ni | 10 | — | — | — | — | — | — | — | — | — |
| Hard phase | WC and impurities | 80 | 90 | 88 | 89.2 | 87 | 86 | 86.5 | 87.5 | 73 | 66 |
| | Other compounds | | | 2.0<br>(TaC) | 0.8<br>($Cr_3C_2$) | 1.0<br>($Cr_3C_2$) | 1.0<br>($Cr_3C_2$)<br>1.0<br>(TaC) | 1.0<br>($Cr_3C_2$)<br>0.5<br>(VC) | 0.5<br>(VC) | 1.5<br>($Cr_3C_2$)<br>0.5<br>(VC) | 1.5<br>($Cr_3C_2$)<br>0.5<br>(VC)<br>2.0<br>(TaC) |
| Average grain size of WC (μm) | | 2.38 | 2.50 | 1.72 | 3.21 | 1.64 | 2.03 | 2.68 | 2.74 | 1.81 | 2.85 |
| Average grain size of other compounds in hard phase (μm) | | — | — | 2.41 | dissolved with binder | | 1.84 | dissolved with binder | | | 2.31 |
| Average grain size of binder phase (μm) | | 457 | 985 | 539 | 738 | 528 | 744 | 1125 | 692 | 734 | 908 |
| Content of impurities (ppm) | | 102 | 108 | 113 | 198 | 209 | 112 | 194 | 138 | 102 | 183 |
| Content of P in impurities (ppm) | | 23 | 59 | 74 | 143 | 88 | 53 | 39 | 98 | 78 | 93 |
| Maximum size of impurities (μm) | | 15.6 | 16.3 | 17.0 | 16.1 | 18.3 | 16.8 | 23.5 | 24.3 | 30.1 | 23.4 |
| Vickers hardness (Hv) | | 884 | 1388 | 1588 | 1329 | 1554 | 1583 | 1710 | 1593 | 1182 | 1013 |

TABLE 3-1

| | Cemented carbide products of the invention | | | | | | | | | |
|---|---|---|---|---|---|---|---|---|---|---|
| | 1 | 2 | 3 | 4 | 5 | 6 | 7 | 8 | 9 | 10 |
| Cutting test of end mill | | | | | | | | | | |
| Length cut until cutting edges undergo chipping (m) | 15.3 | 19.8 | 18.3 | 20.6 | 14.2 | 16.8 | 15.9 | 21.1 | 19.0 | 18.2 |
| Drilling test of drill bit | | | | | | | | | | |
| Number of formed bores | 2335 | 2622 | 2813 | 2216 | 2930 | 2466 | 2024 | 1989 | 2126 | 2038 |
| Bending test of wire member | | | | | | | | | | |
| Diameter of wire member (mm) | 0.5 | 1.0 | 1.5 | 0.3 | 0.05 | 0.1 | 0.5 | 0.5 | 0.5 | 0.5 |

TABLE 3-1-continued

| | Cemented carbide products of the invention | | | | | | | | | |
|---|---|---|---|---|---|---|---|---|---|---|
| | 1 | 2 | 3 | 4 | 5 | 6 | 7 | 8 | 9 | 10 |
| Critical radius of curvature (mm) | 25.0 | 41.0 | 54.0 | 10.2 | 3.5 | 7.2 | 22.5 | 21.0 | 24.5 | 24.0 |

TABLE 3-2

| | Cemented carbide products of the invention | | | | | | | | | |
|---|---|---|---|---|---|---|---|---|---|---|
| | 11 | 12 | 13 | 14 | 15 | 16 | 17 | 18 | 19 | 20 |
| Cutting test of end mill | | | | | | | | | | |
| Length cut until cutting edges undergo chipping (m) | 21.3 | 22.4 | 25.1 | 24.3 | 18.9 | 27.4 | 22.3 | 24.4 | 30.8 | 20.2 |
| Drilling test of drill bit | | | | | | | | | | |
| Number of formed bores | 2083 | 2394 | 2034 | 2169 | 1988 | 2249 | 2358 | 2638 | 2956 | 1894 |

TABLE 4-1

| | Comparative cemented carbide products | | | | | | | | | |
|---|---|---|---|---|---|---|---|---|---|---|
| | 1 | 2 | 3 | 4 | 5 | 6 | 7 | 8 | 9 | 10 |
| Cutting test of end mill | | | | | | | | | | |
| Length cut until cutting edges undergo chipping (m) | 0.6 | 1.3 | 2.3 | 1.2 | 1.8 | 2.4 | 0.3 | 1.8 | 1.6 | 0.1 |
| Drilling test of drill bit | | | | | | | | | | |
| Number of formed bores | 52 | 125 | 84 | 108 | 193 | 209 | 36 | 153 | 116 | 12 |
| Bending test of wire member | | | | | | | | | | |
| Diameter of wire member (mm) | 0.5 | 1.0 | 1.5 | 0.3 | 0.05 | 0.1 | 0.5 | 0.5 | 0.5 | 0.5 |
| Critical radius of curvature (mm) | All the comparative wire members were broken | | | | | | | | | |

TABLE 4-2

| | Comparative cemented carbide products | | | | | | | | | |
|---|---|---|---|---|---|---|---|---|---|---|
| | 11 | 12 | 13 | 14 | 15 | 16 | 17 | 18 | 19 | 20 |
| Cutting test of end mill | | | | | | | | | | |
| Length cut until cutting edges undergo chipping (m) | 0.5 | 2.1 | 2.8 | 1.5 | 2.4 | 2.9 | 1.7 | 2.5 | 0.4 | 2.2 |
| Drilling test of drill bit | | | | | | | | | | |
| Number of formed bores | 42 | 201 | 294 | 124 | 243 | 218 | 46 | 134 | 24 | 36 |

TABLE 5

| | | Cemented carbides of the invention | | | | |
|---|---|---|---|---|---|---|
| | | 21 | 22 | 23 | 24 | 25 |
| Blend compositions (wt. %) | | | | | | |
| Binder phase | Co | 15 | 18 | 20 | 15 | 25 |
| | Ni | — | — | — | 5 | — |
| Hard phase | WC and impurities | 85 | 81.5 | 77.5 | 80 | 73.2 |
| | Other compounds | — | 0.5 ($Cr_3C_2$) | 2.0 (TaC)<br>0.5 ($Cr_3C_2$) | — | 1.0 ($Cr_3C_2$)<br>0.8 (VC) |
| Hot working (Hot drawing) | | | | | | |
| Elongation in drawing direction (%) | | 20 | 20 | 25 | 25 | 25 |
| Heating temperature (°C.) | | 1300 | 1200 | 1150 | 1100 | 1100 |
| Average grain size of WC (μm) | | 0.35 | 0.49 | 0.38 | 0.74 | 0.44 |
| Average grain size of other compounds in hard phase (μm) | | — | dissolved with binder | 0.83 | — | dissolved with binder |
| Average grain size of binder phase (μm) | | 21 | 18 | 35 | 84 | 109 |
| Content of impurities (ppm) | | 29 | 38 | 43 | 24 | 38 |
| Content of P in impurities (ppm) | | 11 | 19 | 12 | 9 | 10 |
| Maximum size of impurities (μm) | | 0.2 | 0.6 | 0.3 | 0.3 | 0.4 |
| Vickers hardness (Hv) | | 1550 | 1430 | 1405 | 1349 | 1236 |

TABLE 6

| | | Comparative cemented carbides | | | | |
|---|---|---|---|---|---|---|
| | | 21 | 22 | 23 | 24 | 25 |
| Blend compositions (wt. %) | | | | | | |
| Binder phase | Co | 15 | 18 | 20 | 15 | 25 |
| | Ni | — | — | — | 5 | — |
| Hard phase | WC and impurities | 85 | 81.5 | 77.5 | 80 | 73.2 |
| | Other compounds | — | 0.5 ($Cr_3C_2$) | 2.0 (TaC)<br>0.5 ($Cr_3C_2$) | — | 1.0 ($Cr_3C_2$)<br>0.8 (VC) |

TABLE 6-continued

| | Comparative cemented carbides | | | | |
|---|---|---|---|---|---|
| | 21 | 22 | 23 | 24 | 25 |
| Hot working | not subjected to hot working | | | | |
| Average grain size of WC (μm) | 2.93 | 3.20 | 1.98 | 2.03 | 2.19 |
| Average grain size of other compounds in hard phase (μm) | — | dissolved with binder | 1.82 | — | dissolved with binder |
| Average grain size of binder phase (μm) | 538 | 468 | 743 | 684 | 1052 |
| Content of impurities (ppm) | 132 | 184 | 233 | 149 | 168 |
| Content of P in impurities (ppm) | 49 | 83 | 139 | 61 | 88 |
| Maximum size of impurities (μm) | 19.2 | 18.8 | 20.6 | 23.2 | 22.4 |
| Vickers hardness (Hv) | 1485 | 1365 | 1320 | 1282 | 1143 |

TABLE 7

| | Cemented carbide products of the invention | | | | |
|---|---|---|---|---|---|
| | 21 | 22 | 23 | 24 | 25 |
| Cutting test of end mill | | | | | |
| Length cut until cutting edges undergo chipping (m) | 22.4 | 23.9 | 26.3 | 20.8 | 25.5 |
| Drilling test of drill bit | | | | | |
| Number of formed bores | 2832 | 2689 | 2893 | 2569 | 2903 |
| Bending test of wire member | | | | | |
| Diameter of wire member (mm) | 0.5 | 0.5 | 0.5 | 0.5 | 0.5 |
| Critical radius of curvature (mm) | 23.4 | 22.8 | 20.6 | 21.6 | 19.7 |

TABLE 8

| | Comparative cemented carbide products | | | | |
|---|---|---|---|---|---|
| | 21 | 22 | 23 | 24 | 25 |
| Cutting test of end mill | | | | | |
| Length cut until cutting edges undergo chipping (m) | 0.3 | 0.8 | 1.4 | 0.7 | 2.3 |
| Drilling test of drill bit | | | | | |
| Number of formed bores | 132 | 91 | 23 | 209 | 186 |
| Bending test of wire member | | | | | |
| Diameter of wire member (mm) | 0.5 | 0.5 | 0.5 | 0.5 | 0.5 |
| Critical radius of curvature (mm) | All the comparative wire members were broken | | | | |

What is claimed is:

1. A wire member of cemented carbide consisting of a binder phase of 4 to 35% by weight of at least one metal selected from the group consisting of cobalt and nickel; 1 to 50 ppm by weight of impurities; and a hard dispersed phase composed of 0.1 to 40% by weight of at least one compound and balance tungsten carbide; said at least one compound being selected from the group consisting of carbides of metals in Groups $IV_A$, $V_A$ and $VI_A$ of the Periodic Table, nitrides of metals in Groups $IV_A$ and $V_A$ of the Periodic Table and solid solution of at least two of said carbides and nitrides, said hard dispersed phase having an average crystal grain size of 0.2 to 1.0 μm, the impurities having a crystal grain size of no larger than 10 μm, said binder phase having an average crystal grain size of 5 to 400 μm.

2. A wire member of cemented carbide according to claim 8, in which said impurities contain no greater than 20 ppm by weight of phosphorous.

3. A wire member of cemented carbide according to claim 8, in which said binder phase is comprised of a hot-worked microstructure.

* * * * *

UNITED STATES PATENT AND TRADEMARK OFFICE

CERTIFICATE OF CORRECTION

PATENT NO. : 5,068,149

DATED : November 26, 1991

INVENTOR(S) : Fumio Shimada, et al.

It is certified that error appears in the above-identified patent and that said Letters Patent is hereby corrected as shown below:

Column 4, line 58: "11.5 mm" should read as --11.5 mmØ--

Column 12, line 38, Claim 2: "claim 8" should read as --claim 1--

Column 12, line 41, Claim 3: "claim 8" should read as --claim 1--

Signed and Sealed this

Thirteenth Day of April, 1993

*Attest:*

STEPHEN G. KUNIN

*Attesting Officer* *Acting Commissioner of Patents and Trademarks*